W. Tucker,
Wood Auger.
N° 21,160. Patented Aug. 10, 1858.

UNITED STATES PATENT OFFICE.

W. TUCKER, OF GLOUCESTER, RHODE ISLAND.

VARIABLE-BORING BIT.

Specification of Letters Patent No. 21,160, dated August 10, 1858.

*To all whom it may concern:*

Be it known that I, WILLIAM TUCKER, late of Blackstone, in the State of Massachusetts, but now of Gloucester, in the county of Providence and State of Rhode Island, have invented an Improved Variable-Boring Bit; and I do hereby declare that the same is fully described and represented in the following specification and the accompanying drawings, of which—

Figure 2:
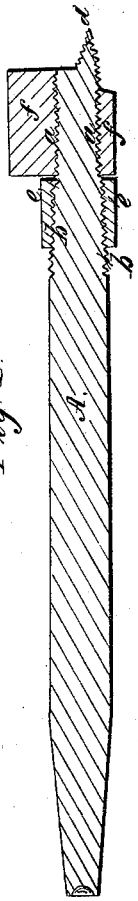
Figure 3:
Figure 1:
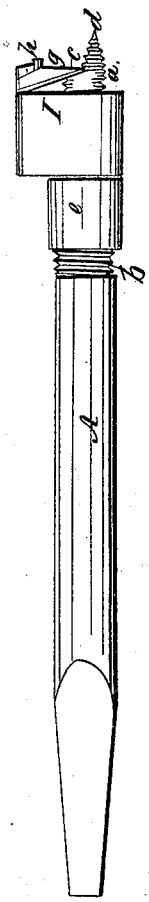
Figure 4:

Figure 1, is a side view of it. Fig. 2, a longitudinal section. Fig. 3, an end view. Fig. 4, a side view of the shank divested of the main cutter and its clamp nut.

In these drawings, A exhibits the shank of the bit as constructed with two male screws, *a*, *b*, one of which has its threads pitch or incline in opposite directions to those of the other, one being a right threaded and the other a left threaded screw. One screw, (viz. *a*,) is arranged in advance of the other (*b*), and carries at its outer end, a cutting edge or cutter, *e*, and a tapering centering point or screw center, *d*. This latter does not have its axis arranged in line with the common axis of the two screws, *a*, *b*, and the shank A, but has it disposed eccentrically, or aside of, parallel thereto and at a distance therefrom. A clamp nut, *e*, screws on the male screw *b*, and against a cutter *f*, which is also screwed on the screw *a*. This cutter *f*, formed as shown in the drawings, is furnished with a cutting edge *g*, which when brought end to end with the cutter, *c*, may form therewith one cutting edge. It also has a small lip or creasing cutter, *h*, standing from it at right angles. The cutter, *f*, should be so constructed that while the bit is in use there will be room for the chips or shavings made by the said cutter *f*, to pass by it and across the clamping nut. With a bit or tool so made, the distance of the axis, of the conical or screw center *d*, from the cutting lip *h*, may be varied by simply turning the cutter, *f*, around on the screw, *a*, as by so doing the said center point or screw may be moved either toward or away from the lip to within certain limits. At whatever distance it may be placed within said limits it may be secured by screwing the clamp nut *e*, forward against the cutter *f*. From the above it will be seen that the bit may be adjusted to bore holes of various dimensions.

Instead of the two screws, *a*, *b*, on the shank A, and having the threads of one pitched in reverse directions to those of the other or in other words so that one shall be a right and the other a left screw, there may be cut on the shank A but one screw for the reception of the cutter, *f*, and the clamp nut, but in this case there would be great liability of displacement of the nut by the action of the cutter during the process of boring with the instrument. The use of two screws, *a*, *b*, arranged, constructed and applied to the nut, *e*, and cutter, *f*, as described, causes the nut to be sure to maintain the cutter in place on the shank when the nut and cutter are in contact.

I am aware that it is not new to make a center bit with a tapering or screw center, made adjustable in such manner with respect to the extreme outer edge of its cutter, as to enable the center bit to be capable of boring holes of different dimensions. Therefore, I do not claim such in the abstract, but What I do claim is—

The combination of a tapering center point or screw center, *d*, and an auxiliary cutter, *c*, arranged on the shank A as described, with a main cutter *f*, applied to the shank so as to be capable of being revolved thereon and fixed in position thereon by means substantially as explained.

In testimony whereof, I have hereunto set my signature.

WILLIAM TUCKER.

Witnesses:
HENRY MARTIN,
ALBERT M. HEWITT.